US012541697B2

(12) United States Patent
Zhang et al.

(10) Patent No.: US 12,541,697 B2
(45) Date of Patent: Feb. 3, 2026

(54) VECTORIZED QUANTUM CONTROLLER

(71) Applicant: Alibaba Innovation Private Limited, Singapore (SG)

(72) Inventors: Fang Zhang, Bellevue, WA (US); Jianxin Chen, Kirkland, WA (US)

(73) Assignee: Alibaba Innovation Private Limited, Singapore (SG)

( * ) Notice: Subject to any disclaimer, the term of this patent is extended or adjusted under 35 U.S.C. 154(b) by 1011 days.

(21) Appl. No.: 17/235,155

(22) Filed: Apr. 20, 2021

(65) Prior Publication Data

US 2022/0335319 A1    Oct. 20, 2022

(51) Int. Cl.
*G06N 10/00*    (2022.01)
*H03K 19/177*    (2020.01)
*H03K 19/195*    (2006.01)

(52) U.S. Cl.
CPC .......... *G06N 10/00* (2019.01); *H03K 19/177* (2013.01); *H03K 19/195* (2013.01)

(58) Field of Classification Search
CPC ...... G06N 10/00; G06N 10/40; H03K 19/177; H03K 19/195
USPC .......................................................... 706/62
See application file for complete search history.

(56) References Cited

U.S. PATENT DOCUMENTS

| | | |
|---|---|---|
| 2015/0236852 A1 | 8/2015 | Tanizawa |
| 2019/0042971 A1* | 2/2019 | Zou .............. G06F 15/16 |
| 2019/0049495 A1* | 2/2019 | Ofek ................ G06F 9/5027 |
| 2020/0034736 A1* | 1/2020 | Mueller ............. G06N 10/00 |
| 2020/0075834 A1 | 3/2020 | Topaloglu et al. |
| 2020/0184361 A1* | 6/2020 | Horii ................ G06F 9/5016 |
| 2021/0157781 A1* | 5/2021 | Gidney .............. G06N 10/00 |

OTHER PUBLICATIONS

Gilchrist, Alexei, et al. "Vectorization of Quantum Operations and Its Use." arXiv (Cornell University), Nov. 2009, arxiv.org/pdf/0911.2539.pdf. (Year: 2009).*
Schriek, E., et al. "A Cryo-CMOS Digital Cell Library for Quantum Computing Applications." IEEE Solid-State Circuits Letters, vol. 3, 2020, pp. 310-313, https://doi.org/10.1109/lssc.2020.3017705. Accessed Oct. 13, 2021. (Year: 2020).*
PCT International Search Report and Written Opinion mailed Jun. 27, 2022, issued in corresponding International Application No. PCT/CN2022/087639 (8 pgs.).

* cited by examiner

*Primary Examiner* — Stephen S Hong
*Assistant Examiner* — Broderick C Anderson
(74) *Attorney, Agent, or Firm* — Finnegan, Henderson, Farabow, Garrett & Dunner, LLP

(57) ABSTRACT

Systems and methods are provided for performing quantum operations. Consistent with disclosed embodiments, a vectorized quantum controller can receive a command from a computing device, the command indicating application of a quantum gate to a qubit of the quantum processor. The vectorized quantum controller can convert the command into one or more quantum assembly instructions, the one or more quantum assembly instructions including a vector instruction for creating a register of qubits, the register including an indication of the qubit. The vectorized quantum controller can execute the one or more quantum assembly instructions to cause the qubit controller to apply the quantum gate to the qubit, and can providing an output to the computing device.

21 Claims, 5 Drawing Sheets

VECTORIZED QUANTUM CONTROLLER

TECHNICAL FIELD

The present disclosure generally relates to quantum computing, and more particularly, to a vectorized quantum controller.

BACKGROUND

A computational device can include a quantum computing accelerator, coprocessor, or processor (e.g., a quantum processor) for performing quantum computing operations. Quantum computing operations can be performed using qubits that are manipulated through the application of quantum gates. Quantum gates can be implemented as pulses of electromagnetic radiation (e.g., microwave pulses or the like). Accordingly, a processor can be implemented to provide instructions to waveform generators. The waveform generators in turn generate the quantum gates that are applied to the qubits (e.g., superconducting circuits, or another suitable qubit implementation). Analog to digital converters (ADCs) can be used together with the waveform generators to readout the states of qubits.

SUMMARY

The disclosed systems and method concern a processor configured to communicate with a computing device. The processor can provide instructions to qubit controllers based on instructions received from the computing device. In some instances, the instructions provided to the qubit controllers can configure waveform generators and trigger application of pulses of electromagnetic radiation to qubits. In various instances, the instructions can configure the ADCs and waveform generators to read out a state of a qubit.

The disclosed embodiments include a system for performing quantum operations. The system can include a qubit, a qubit controller, and vectorized quantum controller. The qubit controller can include circuitry configured to provide control signals to the qubit. The vectorized quantum controller can include circuitry configured to perform operations. The operations can include receiving a command from a computing device, the command indicating application of a quantum gate to the qubit. The operations can further include converting the command into one or more quantum assembly instructions, the one or more quantum assembly instructions including a vector instruction for creating a register of qubits, the register including an indication of the qubit. The operations can additionally include executing the one or more quantum assembly instructions to cause the qubit controller to apply the quantum gate to the qubit. The operations can further include providing an output to the computing device.

The disclosed embodiments include a method for performing quantum operations. The method can include receiving, by a vectorized quantum controller of the quantum processor, a command from a computing device, the command indicating application of a quantum gate to a qubit of the quantum processor. The method can further include converting, by the vectorized quantum controller, the command into one or more quantum assembly instructions, the one or more quantum assembly instructions including a vector instruction for creating a register of qubits, the register including an indication of the qubit. The method can additionally include executing the one or more quantum assembly instructions to cause a qubit controller of the quantum processor to apply the quantum gate to the qubit. The method can further include providing an output to the computing device.

The disclosed embodiments include a non-transitory computer-readable medium containing instructions. When executed by a vectorized quantum controller of a quantum processor, the instructions can cause the vectorized quantum controller to perform operations. The operations can include receiving a command from a computing device, the command indicating application of a quantum gate to a qubit of the quantum processor. The operations can include converting the command into one or more quantum assembly instructions, the one or more quantum assembly instructions including a vector instruction for creating a register of qubits, the register including an indication of the qubit. The operations can further include executing the one or more quantum assembly instructions to cause a qubit controller of the quantum processor to apply the quantum gate to the qubit. The operations can include providing an output to the computing device.

The disclosed embodiments include a vectorized quantum controller for performing quantum operations. The vectorized quantum controller can include a communications controller, a command processor, and an output control. The communications controller can include circuitry configured to receive a command from a computing device, the command indicating application of a quantum gate to a qubit. The command processor can include circuitry configured to convert the command into one or more quantum assembly instructions, the one or more quantum assembly instructions including a vector instruction for creating a register of qubits, the register including an indication of the qubit; and execute the one or more quantum assembly instructions to generate configuration information and trigger information. The output control can include circuitry configured to provide the configuration information and the trigger information to a qubit controller.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Figure 1:
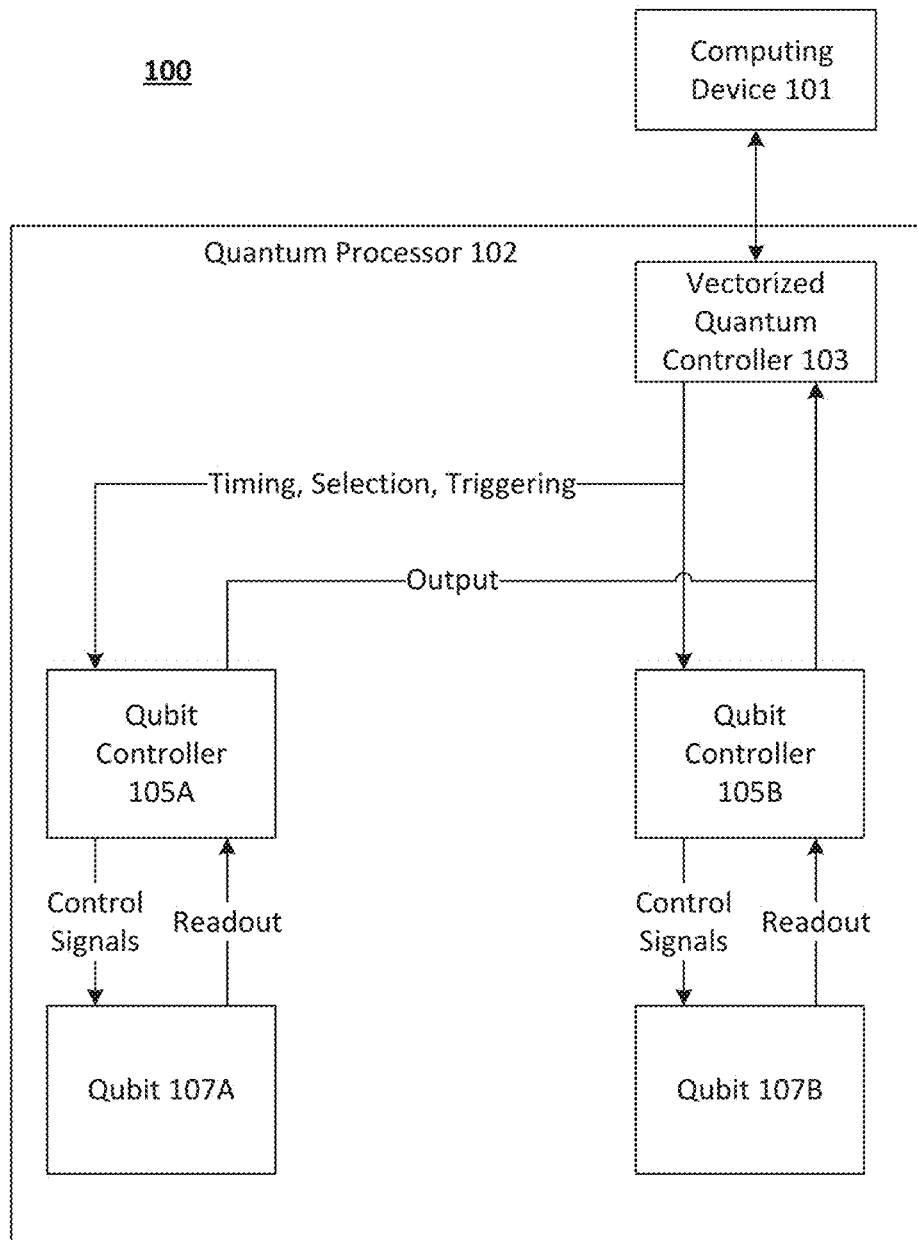
FIG. 1 depicts a schematic of an exemplary system including a computing device and a quantum processor, in accordance with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

A quantum processor can be configured using a quantum assembly language to perform quantum operations. The quantum assembly language can include quantum instructions that specify the application of a quantum gate to one or more qubits. For example, a quantum instruction may specify the application of a one-qubit gate to a single qubit, or the application of a two-qubit gate to a pair of qubits. Unlike conventional computing, a quantum operation may necessarily involve the contemporaneous application of quantum gate(s) to multiple qubits. Furthermore, some quantum operations may require strictly timed application of gates to qubits.

Configuring a conventional quantum processor to perform quantum operations involving multiple qubits or gates may require multiple quantum instructions. As a non-limiting example, a quantum operation may require application of single-qubit gate X to five qubits. In this example, the quantum instruction "X qubit_identifier" may cause the quantum processor to apply the single-qubit gate X to the qubit indicated by qubit_identifier. In response to an instruction to perform the quantum operation on qubits 1, 2, 3, 7, and 10, the controller of the quantum processor may execute the following quantum assembly language:

X 1
X 2
X 3
X 7
X 10

But the quantum operation may require contemporaneous application of single-qubit gate X to qubits 1, 2, 3, 7, and 10. Accordingly, in this example, the instruction rate of the controller may determine whether the quantum processor can execute the quantum operation. Even when the quantum operation does not impose timing requirements (e.g., contemporaneous application, or the like) on the application of gates to qubits, the instruction rate of the controller may become a limiting factor in the performance of the quantum processor, even when the controller is implemented using a superscalar processor.

A quantum processor can be configured to support quantum instructions that apply gates to qubits identified by the contents of a target register. As a non-limiting example, the following two quantum instructions can store the indices for qubits 1, 2, 3, 7, and 10 in the target register TM and then apply the quantum gate X to the qubits identified by the contents of target register TM:

TARGET TM 1 2 3 7 10
X TM

As described herein, application of the quantum gate X to the identified qubits can involve providing electromagnetic pulses to the qubits. Thus, configuring the quantum processor to support such quantum instructions can include configuring the controller of the quantum processor to provide suitable instructions to other components of quantum processor (e.g., waveform generators, bias sources, or the like) to contemporaneously apply the specified quantum gate to the specified qubits.

Quantum instructions that associate qubits with target registers may be difficult to scale to quantum processors having large numbers of qubits. For example, when a quantum processor includes 256 qubits, each qubit may require an eight-bit integer identifier. Accordingly, the quantum instruction TARGET TM 1 2 3 7 10 may require 40 bits, plus any bits required to identify the instruction and the register. Furthermore, the number of bits required may depend on the number of qubits being assigned to the target register.

Consistent with disclosed embodiments, a vector quantum processor can support scalable, contemporaneous execution of quantum operations. Such a processor can include a vector controller configured to support quantum vector instructions. For example, execution of the following quantum vector instructions can cause the vector controller to load 10 qubit indices at memory location A and then perform gate X on the indicated qubits:

TARGET TM A 10
X TM

In this manner, a quantum processor can be configured to support quantum operations that include performance of a gate (or multiple gates) on multiple qubits (or multiple pairs of qubits, multiple triplets of qubits, etc.).

FIG. 1 depicts a schematic of an exemplary system 100 including a computing device and a quantum processor, in accordance with disclosed embodiments. Computing device 101 can be configured to provide instructions to quantum processor 102, which can implement these instructions using quantum operations to affect qubit states. In some instances, the instructions can be readout instructions. Quantum processor 102 can be configured to read out one or more qubit states in response to receiving such readout instructions. In this manner, system 100 can use quantum processor 102 to perform quantum computations that cannot be performed, or cannot be efficiently performed, using conventional computing devices.

Consistent with disclosed embodiments, computing device 101 can be a conventional digital computing device (e.g., a mobile device, laptop, desktop, workstation, computing cluster, or cloud-computing instance implemented on a cloud-computing platform), or a conventional portion of a computing device combining digital and quantum processors. The disclosed embodiments are not limited to any particular implementation for communications between computing device 101 and quantum processor 102. Consistent with disclosed embodiments, computing device 101 can be configured to communicate with quantum processor 102 using a bus (e.g., a PCI express bus, RapidIO, Hypertransport, QuickPath Interconnect, or other suitable standard) or using a network (e.g., using an ethernet connection or the like).

Consistent with disclosed embodiments, quantum processor 102 can include a vectorized quantum controller 103, one or more qubit controllers (e.g., qubit controller 105A and qubit controller 105B), and one or more qubits (e.g., qubit 107A and qubit 107B). The particular arrangement of qubit controllers and qubits depicted in FIG. 1 is not intended to be limiting. In some instances, for example, a qubit controller can be configured to control multiple qubits. Quantum processor 102 can include cryogenic systems for maintaining qubits at suitable temperatures for quantum computation. Quantum processor 102 can further include noise reducing filters disposed between qubit controller outputs and qubits, and low noise amplifiers disposed between qubit readouts and qubit controller inputs.

Consistent with disclosed embodiments, vectorized quantum controller 103 can be configured to communicate with computing device 101. In some instances, vectorized quantum controller 103 can receive instructions from computing device 101. Such instructions can include instructions to perform quantum gate(s) on qubit(s) or readout qubit state(s). Vectorized quantum controller 103 can be configured to convert such instructions into commands for qubit controllers. In some instances, such commands can specify which waveform to generate, a time to generate the waveform, or trigger the generation of a waveform, as described herein. In various instances, such commands can specify that a qubit controller readout the state of a qubit. The commands can then be provided to qubit controllers 105A and 105B, as shown. In some instances, for example in response to commands to readout a state of a qubit, vectorized quantum controller 103 can receive data from a qubit controller. In some instances, the state data can describe a measured state of the qubit (e.g., whether the qubit was in a state corresponding to "0" or the state corresponding to "1"). In some embodiments, the state data can describe a population of eigenstates of the qubit.

Consistent with disclosed embodiments, a qubit controller (e.g., qubit controller 105A or qubit controller 105B) can be configured to communicate with one or more qubits. The qubit controller can be or include one or more digital computing devices. In some embodiments, the qubit controller can include waveform generator(s), bias sources, microwave sources, or the like.

In some embodiments, the qubit controller can include a waveform generator output multiplexed with a microwave source and connected to an XY control line of a qubit. In some instances, the XY control line can be used to excite a state of the qubit.

In some embodiments, the qubit controller can include a waveform generator output connected to a Z control line of the qubit. A bias source can also be connected to the Z control line of the qubit. The waveform generator output and the bias source can provide signals to the Z control line to tune the qubit frequency.

In some embodiments, the qubit controller can include a waveform generator multiplexed with a microwave source and connected to a readout line of the qubit. The waveform generator can be configured to provide a probe signal to the readout line of the qubit. An analog to digital converter (ADC) can be connected to the readout line (e.g., to the other end of the readout line). The ADC can be configured to measure the signal output by the readout line in response to provision of the probe signal. The qubit controller can include the ADC. The qubit controller (or another component of the quantum processor, such as the vectorized quantum controller) can determine an amplitude and phase from the output signal. The amplitude and phase of the output signal can be used to determine the state of the probed qubit(s). The disclosed embodiment are not limited to any particular method of measuring the state of the qubits.

As described herein, a qubit controller can be configured to communicate with vectorized quantum controller 103. In some embodiments, the waveform generator(s) of the qubit controller can be configured to store multiple different pulse envelopes. These pulse envelopes may correspond to different quantum gates. The vectorized quantum controller 103 can provide the qubit controller a selection of gate(s) (or pulse envelope(s)) to provide to the qubit. In some embodiments, the waveform generator(s) can be configured to provide the selected gate(s) (or selected one or more pulse envelopes) at particular time(s). The disclosed embodiments are not limited to any particular method of indicating the times. In some embodiments, the time(s) can be indicated by a vector of timestamps. The timestamps can indicate a number of units (e.g., microseconds, clock ticks, or another suitable time unit) from initiation of stimulation until provision of pulse. In various embodiments, the waveform generators can be configured to initiate stimulation in response to a trigger command.

As a non-limiting example of communication between vectorized quantum controller 103 and a qubit controller, vectorized quantum controller 103 can indicate that the qubit controller shall provide a pulse corresponding to a Hadamard gate to the qubit, beginning 10 microseconds after initiation of stimulation. The vectorized quantum controller 103 can also provide a trigger signal to initiate stimulation. In some embodiments, the qubit controller can provide an acknowledgement signal to the vectorized quantum controller 103 to indicate that the qubit controller is configured to provide the stimulation. In such embodiments, the vectorized quantum controller 103 can provide the trigger signal in response to the acknowledgement signal.

Consistent with disclosed embodiments, qubits (e.g., qubit 107A and qubit 107B) can be implemented using superconducting quantum circuits. Such qubits can be based on currents (e.g., flux qubits) or charges (e.g., charge qubits), or energy (e.g., phase qubits). Different implementations can have different characteristics, such as sensitivity to external noise, coherence time, or anharmonicity. For example, a transmon qubit, a type of charge qubit including a capacitively shunted Josephson junction, can exhibit a reduced sensitivity to charge noise. As an additional example, fluxonium qubit, a type of flux qubit including a Josephson junction shunted by a capacitor and an inductor (the latter realizable using an array of additional Josephson junctions), can exhibit long coherence times and large anharmonicity. The disclosed embodiments are not limited to any particular qubit implementation. In some embodiments, multiple qubits can be implemented using a single superconducting circuit.

In some embodiments, qubits can be configured to receive control signals from a qubit controller and provide readout output signals to the qubit controller. The control signals can include in-phase and quadrature pulse envelopes or DC bias waveforms. In some embodiments, the waveforms can be or modulate microwave signals that are provided to the qubits. The readout output signal can be generated in response to a probe signal provided by the qubit controller. For example, the readout signal can be a dispersive readout signal encoding information about the state of the qubit.

As described herein, the qubit controller can be provisioned with stored waveforms. In some embodiments, the qubit controllers can communicate with vectorized quantum controller 103 to receive the waveforms. In various embodiments, the qubit controllers can communicate with computing device 101 (or another computing device) to receive the waveforms. As a non-limiting example, the waveform generator(s) of a qubit controller can be connected to computing device 101 (or another computing device) using a bus or network. This separate connection can be used to load waveforms into the memor(ies) of the waveform generator(s).

Figure 2A:
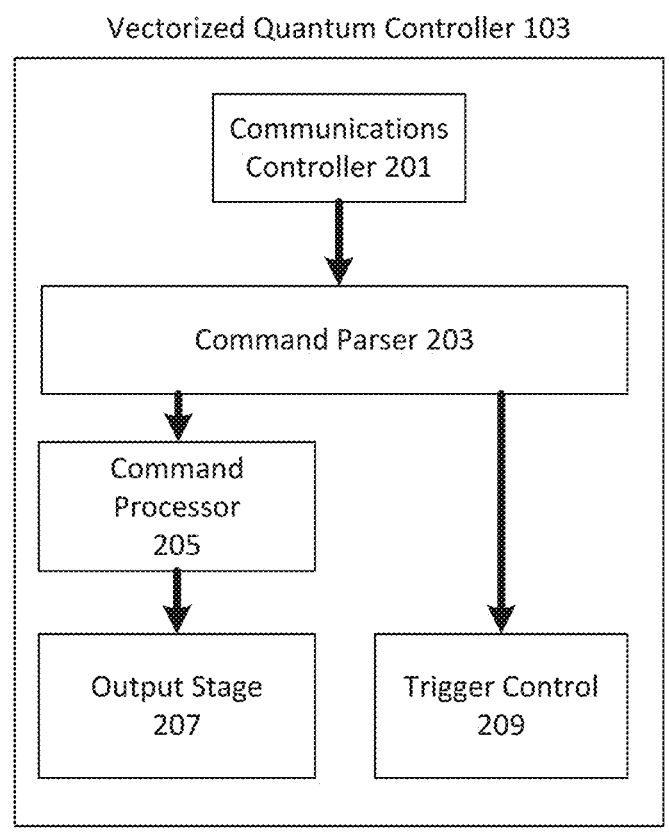
FIG. 2A depicts a schematic of a first implementation of an exemplary vectorized quantum controller, in accordance with disclosed embodiments.

FIG. 2A depicts a schematic of a first implementation of an exemplary vectorized quantum controller 103, in accordance with disclosed embodiments. As depicted in FIG. 1, vectorized quantum controller 103 can be configured to receive instructions from computing device 101, provide commands to qubit controllers, and receive output data (or qubit state data) from the qubit controllers. In some embodiments, vectorized quantum controller 103 can be implemented using a field programmable gate array (FPGA), application-specific integrated circuit (ASIC), or microprocessor. In some embodiments, vectorized quantum controller 103 can be configured to implement a RISC-V processor using an expanded instruction set. In some embodiments, the expanded instruction set can include the standard RISC-V extension for vector operations. In various embodiments, the expanded instruction set can be configured to handle variable length instruction word (VLIW) encodings. In some embodiments, the behavior of vectorized quantum controller 103 can be specified in a hardware description language (e.g., Verilog or VHDL), which can then be synthesized and routed onto an FPGA implementing the vectorized quantum controller 103.

Consistent with disclosed embodiments, communications controller 201 can enable vectorized quantum controller 103 to communicate with computing device 101. In some embodiments, communications controller 201 can be a PCIe controller, or a similar controller adapted for a similar communication standard. Communications controller 201 can provide instructions received from computing device 101 to command parser 203.

Consistent with disclosed embodiments, command parser 203 can be configured to convert a command received from communications controller 201 into quantum assembly instructions.

In some embodiments, vectorized quantum controller 103 may omit command parser 203. In such embodiments, an assembler of computing device 101 can convert pseudo-instructions into quantum assembly instruction(s). The quantum assembly instructions can then be provided to vectorized quantum controller 103 in the command. In such embodiments, the quantum assembly instructions can be provided by communications controller 201 to command processor 205.

Command processor 205 can be configured to process the quantum assembly instructions. In some instances, the quantum assembly instructions can include instructions corresponding to the application of quantum gates to qubits. For example, as described above, execution of the instruction X register can cause the quantum processor to apply the gate X to the qubits indicated by the indices stored in register. Consistent with disclosed embodiments, command processor 205 can be configured to convert instructions received from command parser 203 into commands for qubit controllers.

As a non-limiting example, command processor 205 can process an instruction CNOT registerA registerB that applies a CNOT gate to pairs of qubits specified by registerA and registerB (e.g., the first qubit in registerA paired with the first qubit in registerB, then the second qubit in registerA paired with the second qubit in registerB, etc.). Command processor 205 can decompose this instruction into commands for the specified qubits. For example, such commands can include configuration commands to waveform generators or bias sources in the qubit controllers. Such configuration commands can include a command to change a z bias on a qubit to tune both qubits in a pair to the same frequency. Such configuration commands can include a command to provide electromagnetic stimulation to one of the qubits in a pair of qubits. The electromagnetic stimulation can be specified in terms of a particular pulse envelope (which may have a particular shape, amplitude, and duration) and a particular start time (relative to the start of gate application).

In some embodiments, the commands for the specified qubits can be provided sequentially by command processor 205 to output stage 207. For example, command processor 205 can communicate with output stage 207 using a serial interface (e.g., serial peripheral interface, or another suitable interface). The order in which commands are provided is not intended to be limiting. For example, command processor 205 can provide waveform selection commands for all qubits and then provide timing commands for all qubits. As an alternative example, command processor 205 can provide waveform and timing commands for a first qubit and then provide waveform and timing commands for the second qubit, etc. In various embodiments, the commands for the specified qubits can be provided in parallel by command processor 205 to output stage 207.

Output stage 207 can be configured to route commands to appropriate qubits. In some embodiments, each qubit controller can be associated with a communication channel (e.g., one or more PCIe lanes, or the like). Output stage 207 can be configured to communicate with each qubit controller using the communication channel associated with that controller. Command processor 205 can provide an indication of the destination of a command (e.g., an indication of a particular qubit controller, a particular qubit, a combination thereof, or another suitable indication). Output stage 207 can then route the command to the appropriate qubit controller. In various embodiments, output stage 207 can broadcast commands on a communications channel shared by all qubit controllers, together with an indication of the destination qubit controller (or destination qubit). In some embodiments, output stage 207 can be configured to provide clocking, retiming or jitter cleaning functionality.

Consistent with disclosed embodiments, command parser 203 can be configured to provide instructions to trigger control 209. While command processor 205 can provide configuration instructions to qubit controllers (through output stage 207), trigger control 209 can provide trigger signals to start quantum gate application to the qubit controllers. In some embodiments, trigger control 209 can await confirmation signals from the qubit controllers before providing such trigger signals. For example, when a command specifies application of a quantum gate to qubits 1 and 2 (controlled by qubit controller A) and qubit 5 (controlled by qubit controller B), trigger control 209 can be configured to await confirmation signals from qubit controllers A and B before providing the trigger signals. In some embodiments, the trigger signals may only be provided to the qubit controllers configured to apply the gates. In some embodiments, the trigger signals can be provided on the same communications channels as the configuration instructions. In various embodiments, the trigger signals can be provided on separate communications channels. As a non-limiting example, the communications channels can be specific to the waveform generators. The trigger signals can be transistor-transistor logic (TTL) signals, provided on a single-wire, system-ground-referenced connection to TTL trigger inputs on each waveform generator.

Figure 2B:
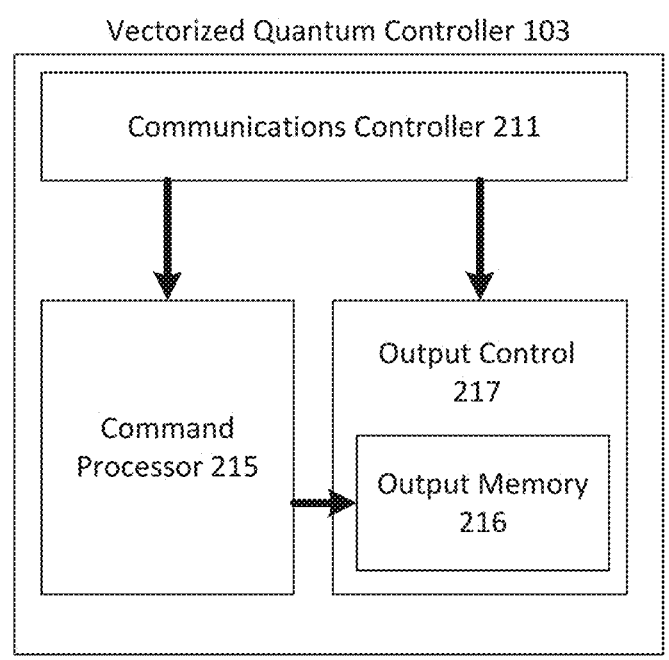
FIG. 2B depicts a schematic of a second implementation of an exemplary vectorized quantum controller, in accordance with disclosed embodiments.

FIG. 2B depicts a schematic of a second implementation of an exemplary vectorized quantum controller 103, in accordance with disclosed embodiments. As depicted in FIG. 1, vectorized quantum controller 103 can be configured to receive instructions from computing device 101, provide commands to qubit controllers, and receive output data (or qubit state data) from the qubit controllers. In some embodiments, vectorized quantum controller 103 can be implemented using a field programmable gate array (FPGA), application-specific integrated circuit (ASIC), or microprocessor. In some embodiments, vectorized quantum controller 103 can be configured to implement a RISC-V processor using an expanded instruction set. In some embodiments, the expanded instruction set can include the standard RISC-V extension for vector operations. In various embodiments, the expanded instruction set can be configured to handle variable length instruction word (VLIW) encodings. In some embodiments, the behavior of vectorized quantum controller 103 can be specified in a hardware description language (e.g., Verilog or VHDL), which can then be synthesized and routed onto an FPGA implementing the vectorized quantum controller 103.

Consistent with disclosed embodiments, communications controller 211 can enable vectorized quantum controller 103 to communicate with computing device 101. In some embodiments, communications controller 211 can be a PCIe controller, or a similar controller adapted for a similar communication standard. Communications controller 211 can provide instructions received from computing device 101 to command processor 215.

Command processor 215 can be configured to process the quantum assembly instructions, in accordance with disclosed embodiments. In some embodiments, command processor 215 can be configured to convert pseudo-instructions received from computing device 101 (e.g., through communications controller 211, or the like) into quantum assembly instructions (and then process these instructions). Command processor 215 can be configured by quantum assembly instructions to write instructions for qubit controllers (e.g., instructions to apply waveforms or readout states) to output memory 216, as described herein.

Output memory 216 can be a memory accessible to command processor 215 and output control 217, in accordance with disclosed embodiments. In some embodiments, output memory 216 can be implemented using the same FPGA as other components of vectorized quantum controller 103 (e.g., command processor 215, output control 217, or the like). In some embodiments, output memory 216 can be part of output control 217. Command processor 215 can be configured to use the Advanced eXtensible Interface (AXI), or a similar interface, to write to output memory 216. In various embodiments, output memory 216 can be implemented using another component (e.g., a discrete memory component, or the like).

Output memory 216 can implement memory-mapped I/O, consistent with disclosed embodiments. Memory addresses in output memory 216 can be mapped to "channels" of qubit(s). A channel can be an abstraction of the physical connection between the qubit controller and the qubit. For example, an XY control line of a qubit can be represented by an input channel. As an additional example, a z control line (or a z control line and bias source) can be represented by an input channel. As a further example, a probe input, output, and ADC (and in some embodiments circuitry for determining a state of the qubit from signals obtained using the ADC) can be represented by an output channel.

Output control 217 can be configured to provide instructions written to output memory 216 to appropriate qubits, in accordance with disclosed embodiments. Output control 217 can be connected to qubits controller(s) using a communication network. In some embodiments, this communication network can be separate from the communication network connecting vectorized quantum controller 103 to computing device 101. In some embodiments, output control 217 can be configured to manage communication between vectorized quantum controller 103 and the qubit controller(s). For example, output control 217 can convert instructions to an appropriate protocol for communication over the network and provide the instructions to the qubit controller according to the protocol.

TABLE I

| Instruction Type | Instruction Parameter |
|---|---|
| Trigger | Channels, repeat count, repeat interval, earliest time |
| Wait | Time |
| Play | Channel, waveform index |
| Acquire | Channel, measurement configuration, destination address |

Table I provides a non-limiting example of instructions that can be written to or read from addresses corresponding to memory or registers for channels. In this example, parameters in bold are determined by the memory mapping (e.g., a "Play" instruction written to a memory address mapped to channel 1 will be provided to the qubit implementing channel 1). Italicized parameters are retained for the next command of the same time written to the same address in memory 216. In some instances, the italicized parameter values can be overwritten by new values.

In some embodiments, command processor 215 can be configured to write configuration instructions (e.g., the "wait", "play", or "acquire" instructions, or similar instructions affecting the waveforms provided and the timing of waveform provision) to output memory 216.

Consistent with disclosed embodiments, the "Wait" instruction can instruct a channel to delay an amount of time before processing the next instruction. In some embodiments, a wait instruction can specify a time since the last wait instruction within a set of stored instructions (e.g., by repeating wait 100 three times actions at timing points 100, 200, and 300 can be specified). In various embodiments, output control 217 can be configured to convert wait instructions to trigger-referenced timings (e.g., relative wait timings wait 100, wait 100, and wait 100 can be converted to trigger-referenced wait 100, wait 200, and wait 300). In some embodiments, a fixed memory address in output memory 216 can be assigned to the wait instructions.

Consistent with disclosed embodiments, the "Play" instruction can instruct a channel to play a waveform having a specified index. In some embodiments, the index can be determined by computing device 101 when computing device 101 provides the waveforms to the qubit controllers. In various embodiments, the indices can be predetermined and the computing device 101 can configure the qubit controllers to store the waveforms according to the predetermined indices. In some embodiments, rather than specifying the channel and the waveform index, the memory address to which the waveform index is written can specify the channel. In some embodiments, the "Play" instruction can include a memory region for storing the waveform index for each channel. Each play instruction can then specify a waveform index for each channel (which may be a default or zero-output index for channels not intended to provide a waveform in response to that particular "Play" instruction).

Consistent with disclosed embodiments, the "Acquire" instruction can cause output control 217 to provide instructions to a qubit controller implementing a channel to acquire data from a qubit. In some embodiments, the qubit controller can be configured to provide a probe waveform to the qubit and acquire measurements using an ADC. A measurement configuration parameter can specify details of the measurement (e.g., the number of samples acquired, the frequencies sampled, or the like). The acquire instruction can include a destination address for the qubit controller to provide the output. In some embodiments, the qubit controller can be configured to convert the measurements into a binary-valued output measurement (or, when multiple measurements are provided, a sum of the measurements).

In some embodiments, similar to the "Play" instruction, the memory address to which the measurement configuration (or destination address) is written can specify the channel. In some embodiments, the "Acquire" instruction can include a memory region for storing the measurement configuration (or destination address) for each channel. Each "Acquire" instruction can then specify a measurement configuration (or destination address) for each channel (which may be a default or zero-read index for channels not intended to obtain a measurement in response to that particular "Acquire" instruction).

Command processor 215 can be configured to write a trigger instruction to output memory 216. The trigger instruction can specify the channels that the trigger should be sent to (e.g., the parameter "Channels" can be a bitmask of the channels to which trigger instructions should be sent, or the like). In some embodiments, in response to a trigger signal specifying that a trigger be sent to a channel, output control 217 can provide stored configuration instructions (e.g., the "Wait", "Play", and "Acquire" instructions) for that channel to the qubit controller implementing that channel. After the configuration instructions are provided to the channel, output control 217 can then provide the trigger signal to the channel. In some embodiments, the qubit controller can process instructions in the order that they are received. Accordingly, the qubit controller can be configured and then triggered. The trigger instruction can further provide a number of times to repeat the trigger (e.g., the parameter "repeat count"). The stored configuration instructions for the triggered channel can be provided again to the channel with each repeat. The trigger instruction can further provide a time interval between each repeat of the trigger (e.g., the parameter "repeat interval"). The trigger instruction can further provide an earliest time to send the trigger (with respect to the time of the last trigger sent on that channel). If the earliest time has already passed, output control 217 can provide the trigger immediately. In some embodiments, after all of the repeats of a trigger have been provided on a channel, the stored configuration information for that channel can be cleared.

In some embodiments, the configuration instructions can be vectorized. As a non-limiting example, command processor 215 can process a vectorized "Play" instruction. The vectorized "Play" instruction can take an input parameter specifying a register or memory location of command processor 215. The register or memory location can store a vector of waveform indices. The vectorized play instruction can write the contents of the vector to a vector of addresses in output memory 216. Each address in the vector of addresses can correspond to an input channel for a qubit. As an additional example, command processor 215 can process a vectorized "Acquire" instruction. The vectorized "Acquire" instruction can take an input parameter specifying a register or memory location of command processor 215. The register or memory location can store a vector of measurement configuration information. The vectorized play instruction can write the contents of the vector to a vector of addresses in output memory 216. Each address in the vector of addresses can correspond to an output channel for a qubit.

Consistent with disclosed embodiments, command processor 215 can be configured to process instructions corresponding to the application of quantum gates to qubits. For example, as described above, execution of the instruction X register can cause the quantum processor to apply the gate X to the qubits indicated by the indices stored in register. In some embodiments, an assembler of computing device 101 (or of command processor 205) can be configured to converting the instruction X register into a set of "play," "wait," "acquire," and "trigger" instructions that implement application of gate X to the qubits indicated by the indices stored in register. Command processor 215 can be configured to execute the set of implementing instructions, thereby writing appropriate values to suitable locations in output memory 216, as described herein. In some embodiments, the instruction set of command processor 215 can be extended to include an assembly instruction for applying gate X to the qubits indicated by the indices stored in register. In such embodiments, command processor 215 can write the appropriate waveform indices, delays, triggers, and measurement configuration information to the appropriate memory addresses in output memory 216 for applying gate X to the qubits indicated by the indices stored in register.

As an additional non-limiting example, command processor 215 can process an instruction CNOT registerA registerB that applies a CNOT gate to pairs of qubits specified by registerA and registerB (e.g., the first qubit in registerA paired with the first qubit in registerB, then the second qubit in registerA paired with the second qubit in registerB, etc.). Command processor 205 can decompose this instruction into an appropriate set of "play," "wait," "acquire," and "trigger" instructions for the specified qubits. For example, "play" instructions can be provided to channels corresponding to the z bias on qubits in each pair of qubits, causing the qubits in each pair of qubits to be tuned to the same frequency. Additional "play" instructions can cause the qubit controller(s) to provide electromagnetic stimulation to one of the qubits in a pair of qubits. The electromagnetic stimulation can be specified in terms of a particular pulse envelope (which may have a particular shape, amplitude, and duration) and a particular start time (relative to the start of gate application). A "trigger" instruction can cause the qubit controller(s) to begin applying the CNOT gate to the pairs of qubits. In various embodiments, instruction CNOT registerA registerB can be a quantum assembly instruction supported by command processor 215. In such embodiments, command processor 215 can write the appropriate waveform indices, delays, triggers, and measurement configuration information to the appropriate memory addresses in output memory 216 for applying a CNOT gate to the qubit pairs indicated by the indices stored in registerA and registerB.

Figure 3A:
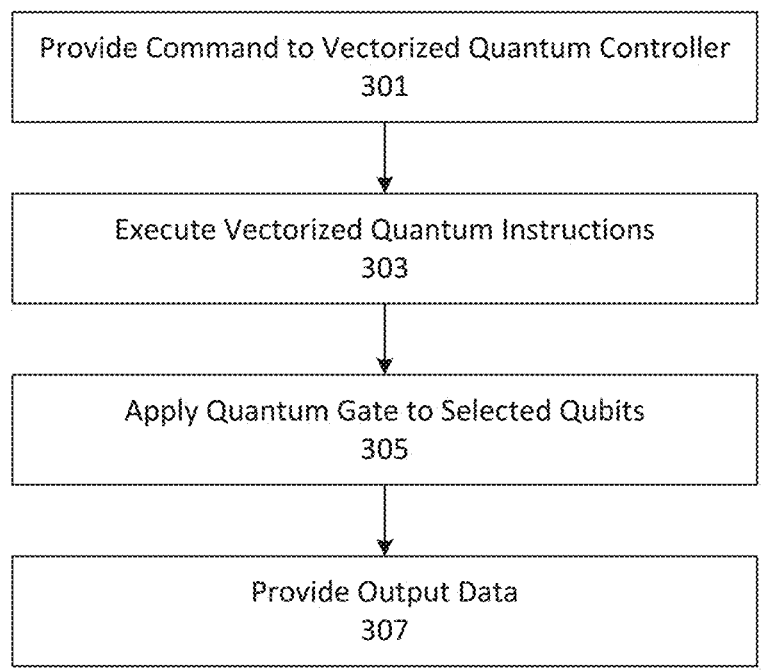
FIG. 3A depicts a flowchart of an exemplary method for performing quantum operations using the exemplary vectorized quantum controller of FIG. 2A, in accordance with disclosed embodiments.

FIG. 3A depicts a flowchart of an exemplary method 300 for performing quantum operations using the vectorized quantum controller of FIG. 2A, in accordance with disclosed embodiments. Method 300 can include steps of providing a command to a vectorized quantum controller (e.g., vectorized quantum controller 103) of a quantum processor (e.g., quantum processor 102), executing vectorized quantum instructions, applying a quantum gate to selected qubits, and providing output data. Consistent with disclosed embodiments, support for vectorized quantum instructions can enable scalable, contemporaneous execution of quantum operations.

In step 301, the vectorized quantum controller can be configured to receive a command from a computing device (e.g., computing device 101), in accordance with disclosed embodiments. The command can specify performance of one or more quantum operations on specific qubits. Consistent with disclosed embodiments, computing device 101 can provide the command during execution of a program. In some instances, computing device 101 can determine that a result can be obtained more quickly using quantum processor 102 than using computing device 101 (e.g., an encrypted message can be decrypted more quickly using quantum processor 102 than using computing device 101).

In step 303, the vectorized quantum controller can be configured to execute vectorized quantum instructions corresponding to the command received from the computing device, in accordance with disclosed embodiments. In some embodiments, the vectorized quantum controller can convert the command to one or more quantum assembly instructions (e.g., using a command parser). The quantum assembly instructions can be part of an instruction set, which can be based on the RISC-V instruction set (e.g., expanded to include vector instructions). In some instances, the command can be a high-level command that specifies the general objectives of the quantum operation, without specifying the particular quantum operations involved. For example, the command can request a private key, given a public key and an encrypted message. In various instances, the command can be a low-level command that specifies particular quantum operations. For example, the command can specify the application of Hadamard gates to all the qubits of the quantum processor.

The quantum assembly instructions can be vectorized assembly instructions. For example, the instructions can use vector operations to load qubit indices into qubit register(s). The instructions can then apply the gates to the qubits (or qubit pairs) indicated by the qubit register(s). Application of the gates to the indicated qubits (or qubit pairs) can include the automatic generation of configuration instructions. These configuration instructions can include waveform selections and timings. The vectorized quantum controller can be configured to provide the waveform selections and timings to the qubit controllers that control the specified qubits.

In some embodiments, the qubit controllers can be configured to acknowledge receipt of the configuration instructions. The qubit controllers can additionally or alternatively acknowledge successful configuration.

The vectorized quantum controller can be configured to provide trigger signals. In some embodiments, the trigger signals can be provided in response to receipt of acknowledgement signals. For example, the vectorized quantum controller can determine that the qubit controllers for all of the specified qubits have indicated successful configuration. In response, the vectorized quantum controller can provide trigger signals to these qubit controllers, to cause them to begin application of the quantum gate to the specified qubits.

In step 305, the quantum processor can apply the quantum gate to the selected qubits, in accordance with disclosed embodiments. The qubit controllers, in response to receiving trigger signals, can provide the specified waveforms with the specified timings to the qubits. In this manner, the quantum gate can be applied to the specified qubits (or qubit pairs).

In step 307, the quantum processor can provide output data to the computing device. In some instances, the output data can be provided in response to the command received from the computing device (e.g., the computing device requests the private key and in response the quantum processor provides the private key). In various instances, the output data can be provided in response to a sequence of commands including the command received in step 301. For example, step 301 can command initialization of specified qubits. Subsequent commands can then specify application of various gates to various qubits. After application of these various gates, a readout command can request the state of one or more qubits. Depending on the readout method, a measurement of the state (e.g., corresponding to a binary value) can be provided, or state data describes populations of eigenstates of the specified qubits.

Figure 3B:
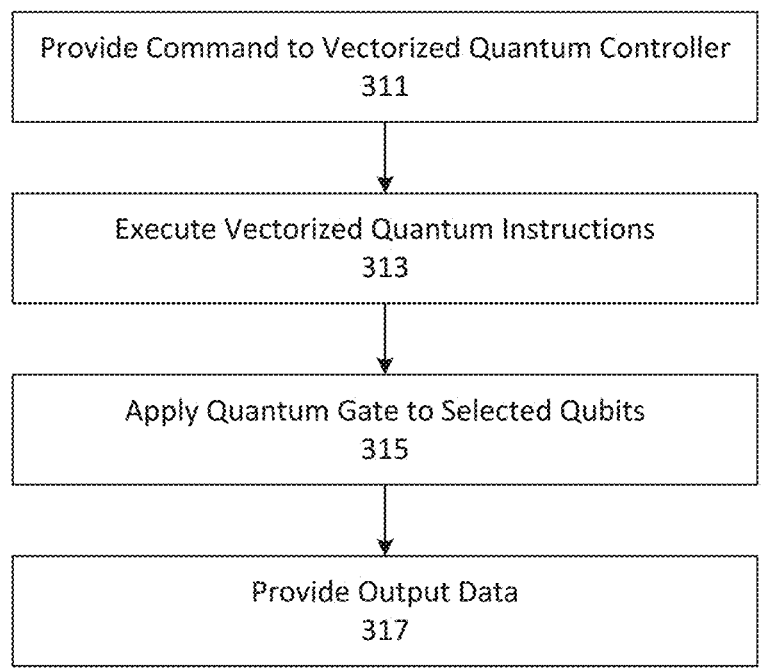
FIG. 3B depicts a flowchart of an exemplary method for performing quantum operations using the exemplary vectorized quantum controller of FIG. 2B, in accordance with disclosed embodiments.

FIG. 3B depicts a flowchart of an exemplary method 310 for performing quantum operations using the vectorized quantum controller of FIG. 2B, in accordance with disclosed embodiments. Method 310 can include steps of providing a command to a vectorized quantum controller (e.g., vectorized quantum controller 103) of a quantum processor (e.g., quantum processor 102), executing vectorized quantum instructions, applying a quantum gate to selected qubits, and providing output data. Consistent with disclosed embodiments, support for vectorized quantum instructions can enable scalable, contemporaneous execution of quantum operations.

In step 311, the vectorized quantum controller can be configured to receive a command from a computing device (e.g., computing device 101), in accordance with disclosed embodiments. The command can specify performance of one or more quantum operations on specific qubits. Consistent with disclosed embodiments, computing device 101 can provide the command during execution of a program. In some instances, computing device 101 can determine that a result can be obtained more quickly using quantum processor 102 than using computing device 101.

In step 313, the vectorized quantum controller can be configured to execute vectorized quantum instructions corresponding to the command received from the computing device, in accordance with disclosed embodiments. In some embodiments, the vectorized quantum controller can convert the command to one or more quantum assembly instructions (e.g., using a command processor). The quantum assembly instructions can be lower-level instructions (e.g., the "Play", "Wait", "Acquire", or "Trigger" instructions as described herein, or the like) or gate-level instructions (e.g., apply gate X to qubits having indices stored in register rs, as described herein, or the like). The quantum assembly instructions can be part of an instruction set, which can be based on the RISC-V instruction set (e.g., expanded to include vector instructions). In some instances, the command can be a high-level command that specifies the general objectives of the quantum operation, without specifying the particular quantum operations involved. For example, the command can request a private key, given a public key and an encrypted message. In various instances, the command can be a low-level command that specifies particular quantum operations. For example, the command can specify the application of Hadamard gates to all the qubits of the quantum processor.

The quantum assembly instructions can be vectorized assembly instructions. For example, the instructions can use vector operations to load qubit indices into qubit register(s). The instructions can then apply the gates to the qubits (or qubit pairs) indicated by the qubit register(s). Application of the gates to the indicated qubits (or qubit pairs) can include the automatic generation of configuration and trigger instructions.

Consistent with disclosed embodiments, the configuration instructions can include waveform selections and timings. A command processor of the vectorized quantum controller (e.g., command processor 215 or the like) can write the configuration instructions to a memory (e.g., output memory 216) accessible to the command processor and an output control of the vectorized quantum controller (e.g., output control 217 or the like). The command processor can write the trigger instructions to the memory. In response to writing of the trigger instructions, the output control can provide the configuration instructions and the trigger to the appropriate qubit controller(s).

In step 315, the quantum processor can apply the quantum gate to the selected qubits, in accordance with disclosed embodiments. The qubit controllers, in response to receiving the configuration instructions can trigger instructions, can provide the specified waveforms with the specified timings to the qubits. In this manner, the quantum gate can be applied to the specified qubits (or qubit pairs).

In step 317, the quantum processor can provide output data to the computing device. In some instances, the output data can be provided in response to the command received from the computing device (e.g., the computing device requests the private key and in response the quantum processor provides the private key). In various instances, the output data can be provided in response to a sequence of commands including the command received in step 311. For example, step 311 can command initialization of specified qubits. Subsequent commands can then specify application of various gates to various qubits. After application of these various gates, a readout command can request the state of one or more qubits. Depending on the readout method, a measurement of the state (e.g., corresponding to a binary value) can be provided, or state data describes populations of eigenstates of the specified qubits.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The foregoing descriptions have been presented for purposes of illustration. They are not exhaustive and are not limited to precise forms or embodiments disclosed. Modifications and adaptations of the embodiments will be apparent from consideration of the specification and practice of the disclosed embodiments. For example, the described implementations include hardware but systems and methods consistent with the present disclosure can be implemented with hardware and software. In some embodiments, the vectorized quantum controller and components thereof (e.g., the communications controller, the command parser, and the command processor) can be implemented using circuitry configured to perform the disclosed functionality/operations (e.g., using an FPGA configured to implement an instruction set augmented to support vector processing and quantum gate operations). In various embodiments, the disclosed functionality can be implemented in software using a high-level programming language (e.g., Python or the like) and a central processing unit-based control stack. In such embodiments, software modules may implement disclosed components (e.g., the communications controller, the command parser, and the command processor). In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in computer-readable media. The computer-readable media can be non-transitory computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A system for performing quantum operations, comprising: a qubit; a qubit controller including circuitry configured to provide control signals to the qubit; and a vectorized quantum controller including circuitry configured to: receive a command from a computing device, the command indicating application of a quantum gate to the qubit; convert the command into one or more quantum assembly instructions, the one or more quantum assembly instructions including a vector instruction for creating a register of qubits, the register including an indication of the qubit; execute the one or more quantum assembly instructions to cause the qubit controller to apply the quantum gate to the qubit; and provide an output to the computing device.
2. The system of clause 1, wherein executing the one or more quantum assembly instructions to cause the qubit controller to apply the quantum gate to the qubit comprises: providing configuration information to the qubit controller; and providing a trigger signal to the qubit controller.
3. The system of clause 2, wherein the configuration information comprises: an indication of a waveform to apply to the qubit; and an indication of a timing of the application of the waveform.
4. The system of any one of clauses 2 to 3, wherein: the vectorized quantum controller comprises a command processor and an output control; and executing the one or more quantum assembly instructions to cause the qubit controller to apply the quantum gate to the qubit comprises writing, by the command processor, the configuration information and the trigger signal to a memory of the qubit controller.
5. The system of any one of clauses 1 to 4, wherein the vectorized quantum controller comprises an FPGA configured to implement a vectorized command processor.
6. The system of clause 5, wherein the vectorized command processor supports an RISC-V instruction set extended to include quantum assembly instructions.
7. The system of any one of clauses 1 to 6, wherein the output comprises a binary-valued measurement, a sum of binary-valued measurements, or state data.
8. The system of any one of clauses 1 to 7, wherein the qubit comprises a superconducting circuit.
9. A method for performing quantum operations using a quantum processor, comprising: receiving, by a vectorized quantum controller of the quantum processor, a command from a computing device, the command indicating application of a quantum gate to a qubit of the quantum processor; converting, by the vectorized quantum controller, the command into one or more quantum assembly instructions, the one or more quantum assembly instructions including a vector instruction for creating a register of qubits, the register including an indication of the qubit; executing the one or more quantum assembly instructions to cause a qubit controller of the quantum processor to apply the quantum gate to the qubit; and providing an output to the computing device.
10. The method of clause 9, wherein executing the one or more quantum assembly instructions to cause the qubit controller to apply the quantum gate to the qubit comprises: providing configuration information to the qubit controller; and providing a trigger signal to the qubit controller.
11. The method of clause 10, wherein the configuration information comprises: an indication of a waveform to apply to the qubit; and an indication of a timing of the application of the waveform.
12. The method of any one of clauses 10 to 11, wherein: the vectorized quantum controller comprises a command processor and an output control; and executing the one or more quantum assembly instructions to cause the qubit controller to apply the quantum gate to the qubit comprises writing, by the command processor, the configuration information and the trigger signal to a memory of the qubit controller.
13. The method of any one of clauses 9 to 12, wherein converting by the vectorized quantum controller comprises converting by an FPGA configured to implement a vectorized command processor.
14. The method of clause 13, wherein the vectorized command processor supports an RISC-V instruction set extended to include quantum assembly instructions.
15. The method of any one of clauses 9 to 14, wherein providing the output comprises providing a binary-valued measurement, a sum of binary-valued measurements, or state data.
16. The method of any one of clauses 9 to 15, wherein applying the quantum gate to the qubit comprises applying the quantum gate to a superconducting circuit.
17. A non-transitory computer-readable medium containing instructions that, when executed by a vectorized quantum controller of a quantum processor, cause the vectorized quantum controller to perform operations comprising: receiving a command from a computing device, the command indicating application of a quantum gate to a qubit of the quantum processor; converting the command into one or more quantum assembly instructions, the one or more quantum assembly instructions including a vector instruction for creating a register of qubits, the register including an indication of the qubit; executing the one or more quantum assembly instructions to cause a qubit controller of the quantum processor to apply the quantum gate to the qubit; and providing an output to the computing device.
18. The non-transitory computer-readable medium of clause 17, wherein executing the one or more quantum assembly instructions to cause the qubit controller to apply the quantum gate to the qubit comprises: providing configuration information to the qubit controller; and providing a trigger signal to the qubit controller.
19. The non-transitory computer-readable medium of clause 18, wherein the configuration information comprises: an indication of a waveform to apply to the qubit; and an indication of a timing of the application of the waveform.

20. The non-transitory computer-readable medium of any one of clauses 18 to 19, wherein: the vectorized quantum controller comprises a command processor and an output control; and executing the one or more quantum assembly instructions to cause the qubit controller to apply the quantum gate to the qubit comprises writing, by the command processor, the configuration information and the trigger signal to a memory of the qubit controller.

21. A vectorized quantum controller for performing quantum operations, comprising: a communications controller including circuitry configured to receive a command from a computing device, the command indicating application of a quantum gate to a qubit; a command processor including circuitry configured to: convert the command into one or more quantum assembly instructions, the one or more quantum assembly instructions including a vector instruction for creating a register of qubits, the register including an indication of the qubit; and execute the one or more quantum assembly instructions to generate configuration information and trigger information; and an output control including circuitry configured to provide the configuration information and the trigger information to a qubit controller.

22. The vectorized quantum controller of clause 21, wherein the command processor is implemented using an FPGA.

23. The vectorized quantum controller of clause 22, wherein the command processor supports an RISC-V instruction set extended to include quantum assembly instructions.

24. The vectorized quantum controller of any one of clauses 21 to 23, wherein the circuitry included in the command processor is further configured to: write the configuration information and the trigger information to a mapped memory of the output control.

25. The vectorized quantum controller of any one of clauses 21 to 24, wherein the configuration information comprises: an indication of a waveform to apply to the qubit by the qubit controller; and an indication of a timing of the application of the waveform.

In the drawings and specification, there have been disclosed exemplary embodiments. However, many variations and modifications can be made to these embodiments. Accordingly, although specific terms are employed, they are used in a generic and descriptive sense only and not for purposes of limitation or restriction of the scope of the embodiments, the scope being defined by the following claims.

What is claimed is:

1. A system for performing quantum operations, comprising:
   a qubit;
   a qubit controller including circuitry configured to provide control signals to the qubit; and
   a vectorized quantum controller including circuitry configured to:
      receive a command from a computing device, the command indicating application of a quantum gate to the qubit;
      convert the command into one or more quantum assembly instructions, the one or more quantum assembly instructions including a vector instruction for applying the quantum gate to each of multiple qubits specified by a register storing, for each qubit, a corresponding qubit identifier value, the register including an identifier value for the qubit;
      execute the one or more quantum assembly instructions to cause the qubit controller to apply the quantum gate to the qubit; and
      provide an output to the computing device.

2. The system of claim 1, wherein executing the one or more quantum assembly instructions to cause the qubit controller to apply the quantum gate to the qubit comprises:
   providing configuration information to the qubit controller; and
   providing a trigger signal to the qubit controller.

3. The system of claim 2, wherein the configuration information comprises:
   an indication of a waveform to apply to the qubit; and
   an indication of a timing of the application of the waveform.

4. The system of claim 2, wherein:
   the vectorized quantum controller comprises a command processor and an output control; and
   executing the one or more quantum assembly instructions to cause the qubit controller to apply the quantum gate to the qubit comprises writing, by the command processor, the configuration information and the trigger signal to a memory of the qubit controller.

5. The system of claim 1, wherein the output comprises a binary-valued measurement, a sum of binary-valued measurements, or state data.

6. The system of claim 1, wherein the qubit comprises a superconducting circuit.

7. The system of claim 1, wherein the vectorized quantum controller comprises an FPGA configured to implement a vectorized command processor.

8. The system of claim 7, wherein the vectorized command processor supports an RISC-V instruction set extended to include quantum assembly instructions.

9. A method for performing quantum operations using a quantum processor, comprising:
   receiving, by a vectorized quantum controller of the quantum processor, a command from a computing device, the command indicating application of a quantum gate to a qubit of the quantum processor;
   converting, by the vectorized quantum controller, the command into one or more quantum assembly instructions, the one or more quantum assembly instructions including a vector instruction for applying the quantum gate to each of multiple qubits specified by a register storing, for each qubit, a corresponding qubit identifier value, the register including an identifier value for the qubit;
   executing the one or more quantum assembly instructions to cause a qubit controller of the quantum processor to apply the quantum gate to the qubit; and
   providing an output to the computing device.

10. The method of claim 9, wherein executing the one or more quantum assembly instructions to cause the qubit controller to apply the quantum gate to the qubit comprises:
    providing configuration information to the qubit controller; and
    providing a trigger signal to the qubit controller.

11. The method of claim 10, wherein the configuration information comprises:
    an indication of a waveform to apply to the qubit; and
    an indication of a timing of the application of the waveform.

12. The method of claim 10, wherein:
    the vectorized quantum controller comprises a command processor and an output control; and executing the one or more quantum assembly instructions to cause the qubit controller to apply the quantum gate to the qubit comprises writing, by the command processor, the configuration information and the trigger signal to a memory of the qubit controller.

13. The method of claim 9, wherein providing the output comprises providing a binary-valued measurement, a sum of binary-valued measurements, or state data.

14. The method of claim 9, wherein applying the quantum gate to the qubit comprises applying the quantum gate to a superconducting circuit.

15. The method of claim 9, wherein converting by the vectorized quantum controller comprises converting by an FPGA configured to implement a vectorized command processor.

16. The method of claim 15, wherein the vectorized command processor supports an RISC-V instruction set extended to include quantum assembly instructions.

17. A vectorized quantum controller for performing quantum operations, comprising:
- a communications controller including circuitry configured to receive a command from a computing device, the command indicating application of a quantum gate to a qubit;
- a command processor including circuitry configured to:
  convert the command into one or more quantum assembly instructions, the one or more quantum assembly instructions including a vector instruction for applying the quantum gate to each of multiple qubits of multiple qubits specified by a register storing, for each qubit, a corresponding qubit identifier value, the register including an identifier value for the qubit; and
  execute the one or more quantum assembly instructions to generate configuration information and trigger information; and
- an output control including circuitry configured to provide the configuration information and the trigger information to a qubit controller.

18. The vectorized quantum controller of claim 17, wherein the command processor is implemented using an FPGA.

19. The vectorized quantum controller of claim 18, wherein the command processor supports an RISC-V instruction set extended to include quantum assembly instructions.

20. The vectorized quantum controller of claim 17, wherein the circuitry included in the command processor is further configured to:
  write the configuration information and the trigger information to a mapped memory of the output control.

21. The vectorized quantum controller of claim 17, wherein the configuration information comprises:
- an indication of a waveform to apply to the qubit by the qubit controller; and
- an indication of a timing of the application of the waveform.

* * * * *